(12) United States Patent
Olbermann

(10) Patent No.: US 10,500,595 B2
(45) Date of Patent: Dec. 10, 2019

(54) STATUS MONITORING SYSTEM AND METHOD FOR MAGNETIC FILTERS

(71) Applicant: Joseph Olbermann, Tijeras, NM (US)

(72) Inventor: Joseph Olbermann, Tijeras, NM (US)

(73) Assignee: MESTEK, INC., Westfield, MA (US)

( * ) Notice: Subject to any disclaimer, the term of this patent is extended or adjusted under 35 U.S.C. 154(b) by 134 days.

(21) Appl. No.: 15/702,900

(22) Filed: Sep. 13, 2017

(65) Prior Publication Data
US 2019/0076851 A1 Mar. 14, 2019

(51) Int. Cl.
| | | |
|---|---|---|
| *B03C 1/28* | (2006.01) | |
| *C02F 1/48* | (2006.01) | |
| *G01K 7/16* | (2006.01) | |
| *F24D 19/10* | (2006.01) | |
| *B03C 1/033* | (2006.01) | |
| *G01K 3/14* | (2006.01) | |
| *G01K 13/02* | (2006.01) | |
| *C02F 101/20* | (2006.01) | |
| *C02F 103/02* | (2006.01) | |

(52) U.S. Cl.
CPC ............ *B03C 1/282* (2013.01); *B03C 1/0332* (2013.01); *B03C 1/286* (2013.01); *C02F 1/481* (2013.01); *F24D 19/1006* (2013.01); *G01K 3/14* (2013.01); *G01K 7/16* (2013.01); *G01K 13/02* (2013.01); *B03C 2201/18* (2013.01); *B03C 2201/24* (2013.01); *B03C 2201/32* (2013.01); *C02F 2101/203* (2013.01); *C02F 2103/02* (2013.01); *C02F 2209/02* (2013.01); *F24D 2220/042* (2013.01)

(58) Field of Classification Search
None
See application file for complete search history.

(56) References Cited

U.S. PATENT DOCUMENTS

| | | | | | |
|---|---|---|---|---|---|
| 3,143,496 | A | * | 8/1964 | Maretzo | ............ B03C 1/288 210/222 |
| 4,388,179 | A | * | 6/1983 | Lewis | ................ B03B 1/02 208/177 |
| 4,755,288 | A | * | 7/1988 | Mitchell | ............. C02F 1/482 123/538 |
| 5,089,129 | A | * | 2/1992 | Brigman | ............ B01D 35/06 210/223 |

* cited by examiner

*Primary Examiner* — Krishnan S Menon
(74) *Attorney, Agent, or Firm* — Grogan, Tuccillo & Vanderleeden, LLP

(57) ABSTRACT

A status monitoring system includes a filter cap operatively connected to a filter housing having an inlet port and an outlet port. A magnet is affixed to the bottom side of the filter cap and extends down into the filter housing. A first thermistor is embedded in the magnet and physically isolated from the fluid for measuring the lagging temperature of the fluid due to the insulating effect of the filtered magnetite surrounding the magnet, while a second thermistor is placed inside the filter housing for measuring the temperature of the fluid. A difference between the measured temperatures, Δt, is then determined. When the Δt reaches a pre-determined point, the status monitoring system would send notification to its user and inform the user to perform the maintenance work on the magnetic filters.

20 Claims, 4 Drawing Sheets

US 10,500,595 B2

STATUS MONITORING SYSTEM AND METHOD FOR MAGNETIC FILTERS

FIELD OF THE INVENTION

The present invention relates generally to monitoring systems and methods and, more particularly, to a status monitoring system and method for magnetic filters.

BACKGROUND OF THE INVENTION

Magnetite sludge, a highly insulative magnetic oxide of iron, is a serious contaminant found in the water of older hydronic heating systems. Its presence has been known to cause a reduction in system efficiency and can potentially lead to the failure of expensive system components, including the boiler. Therefore, water filtration in a hydronic heating system is essential to achieving optimum performance, reliability and longevity of the system, as a whole.

There are a variety of commercially available filters capable of removing the sludge from the water in hydronic heating systems to mitigate against these negative effects. Two such types include conventional mesh filters, which utilize a mesh to capture the sludge, and magnetic filters, which employ strong magnets to produce a magnetic field or loading zone that captures the magnetite sludge. While conventional mechanical/mesh filters can filter the sludge in the same size range as magnetic filters, drawbacks such as flow restrictions are significant to the hydronic heating system.

Magnetic filters, on the other hand, successfully overcome many drawbacks of these conventional filters. However, while the magnetic filters have proven to be effective, the magnetite sludge captured by the magnet often builds up outside the body of the magnet over time, and thereby reduces the filtration efficiency of the magnetic filter. Hence, frequent physical inspection and cleaning of the magnetic filters to assure their continued removal of the sludge from the circulating water are required for the successful ongoing use of the magnetic filters.

In connection with the above, because these magnetic filters are currently unable to remotely provide the user of the hydronic heating system with the status of the magnetic filters (i.e., whether the filter is functioning efficiently to capture magnetite or whether it is near capacity/saturation), the maintenance operations necessary to keep such filters functioning properly are often not performed and completed in a timely fashion. As a result, magnetic filters in the hydronic heating system are often clogged and become ineffective due to the lack of timely cleaning.

In view of the above, there is a need for a system and method that provides for the real-time monitoring of the magnetic filters in a hydronic heating system, and which can remotely provide a user with a notification regarding the needed maintenance work.

SUMMARY OF THE INVENTION

With the forgoing concerns and needs in mind, it is the general object of the present invention to provide a status monitoring system and method.

It is another object of the present invention to provide a status monitoring system and method for magnetic filters.

It is another object of the present invention to provide a status monitoring system that permits a user of a hydronic heating system to monitor the physical status of the magnetic filters within the hydronic heating system.

It is another object of the present invention to provide a status monitoring system which is capable of remotely sending notification to the user of the hydronic heating system regarding the needed maintenance work for the magnetic filters in the hydronic heating system.

It is another object of the present invention to provide a status monitoring system which is capable of receiving parameters input remotely, and which can determine the status of magnetic filters in dependence upon such parameters.

These and other objectives of the present invention, and their preferred embodiments, shall become clear by consideration of the specification, claims and drawings taken as a whole.

According to an embodiment of the present invention, a status monitoring system for a magnetic filter, includes a filter housing having an inlet and an outlet and configured for connection to a fluid flow loop, at least one magnet within said filter housing, a first temperature sensor configured to measure a temperature of said at least one magnet, and a second temperature sensor configured to measure a temperature of a fluid within said fluid flow loop.

According to another embodiment of the present invention, a magnetic filter includes a housing having an inlet and an outlet and defining a reservoir for receiving a fluid, a magnet received within said housing, and a first temperature sensor embedded within said magnet and being configured to detect a temperature of said magnet.

According to yet another embodiment of the present invention, a method for monitoring the status of a magnetic filter includes the steps of sensing a temperature of a fluid circulating through a housing, sensing a temperature of a magnet within the housing, determining a temperature difference between said temperature of said fluid and said temperature of said magnet, comparing said determined temperature difference with a threshold temperature difference, and generating a notification if said determined temperature difference exceeds said threshold temperature difference.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
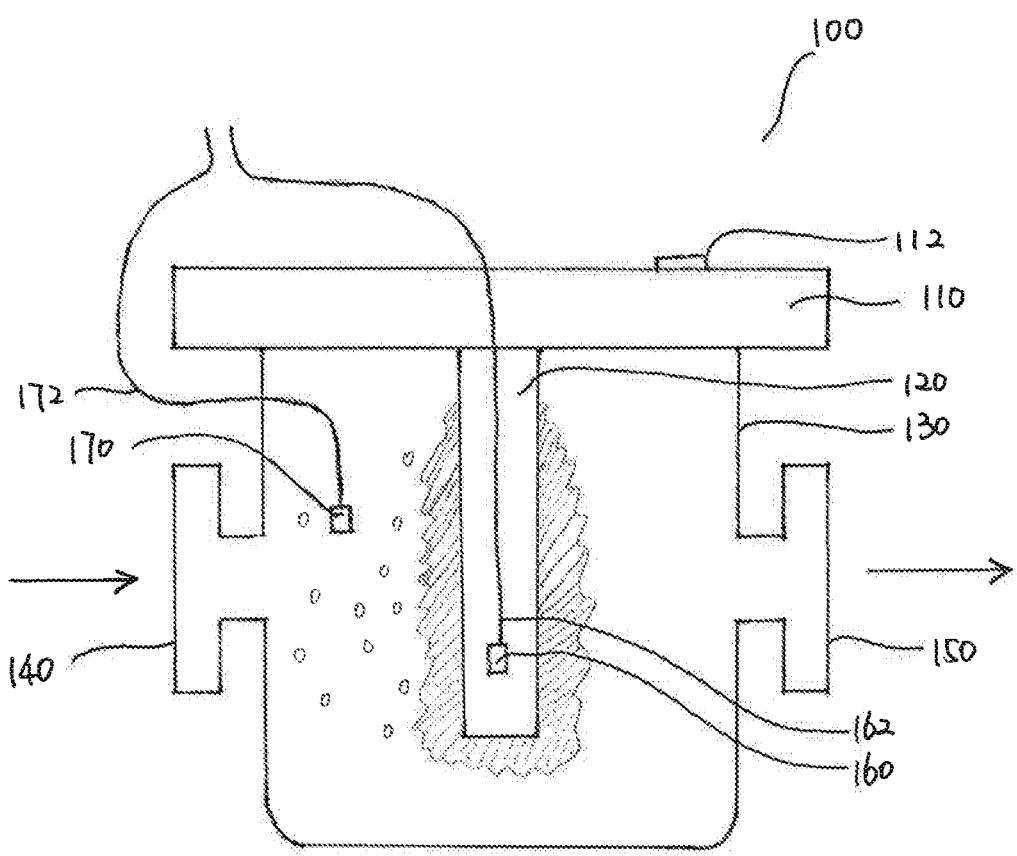
FIG. 1 is a cross-sectional view of a magnetic filter assembly, according to an embodiment of the present invention.

FIG. 1 a cross-sectional view of a magnetic filter assembly 100, according to one embodiment of the present invention. As shown therein, the magnetic filter assembly 100 includes a filter cap 110 operatively connected to a filter housing 130, defining a reservoir therein. The filter housing 130 includes an inlet port 140 and an outlet port 150 for allowing circulating water of a hydronic heating system to pass through the filter assembly 100. Importantly, the filter cap 110 is removable from the filter housing 130. It should be noted that the connection between the filter cap 110 and filter housing 130 is fluid tight so as to prevent fluid in the magnetic filter assembly 100 from leaking through the connection.

In an embodiment, a magnet 120 is disposed within the reservoir for facilitating the removal of magnetite sludge from the fluid. One end of the magnet 120 is affixed to the bottom side of the filter cap 110, and the body of the magnet 120 extends or depends downwardly into the reservoir within the filter housing 130 so as to expose the magnetic field of the magnet 120 to the fluid within the reservoir. Although the magnet 120 is illustrated as being affixed to the bottom of the filter cap 110, other mounting arrangements for the magnet 120 within the reservoir are also possible without departing from the broader aspects of the present invention.

As further illustrated in FIG. 1, a first thermistor 160 is embedded in or otherwise integrated into the magnet 120 for measuring the lagging temperature of the fluid due to the insulating effect of the filtered magnetite surrounding the magnet 120. The first thermistor 160 is placed interior to the magnet 120 and is physically isolated from the fluid in the reservoir so as to ensure that the temperature reading of the first thermistor 160 is the precise temperature internal to the magnet 120.

Figure 2:
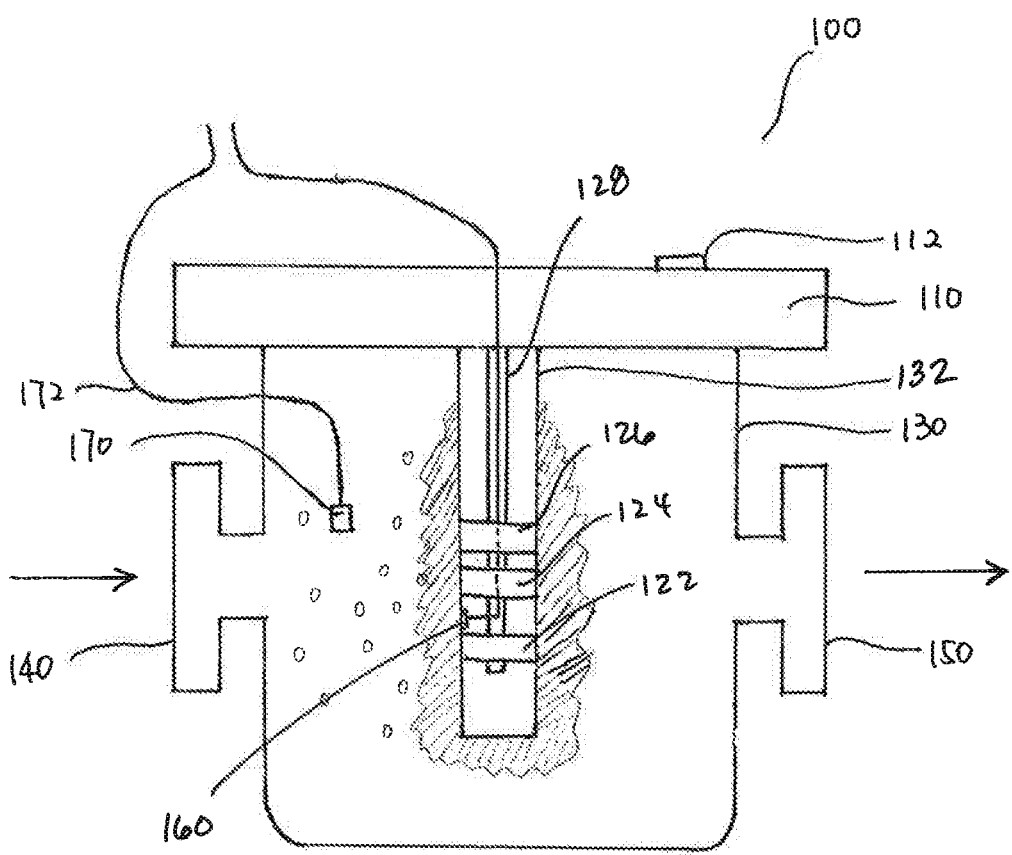
FIG. 2 is a cross-sectional view of a magnetic filter assembly, according to another embodiment of the present invention.

FIG. 2 illustrates an alternative mounting arrangement for the magnets and first thermistor. As shown therein, rather than being mounted directly to the filter cap 110, disc-shaped magnets 122, 124, 126 may be mounted on a hollow, threaded rod 128. The rod 128 with magnets 122, 124, 126 are received within a cylindrical sleeve 132 that extends into the housing 130 such that the peripheral surfaces of the magnets are in close association or touching contact with the inner wall of the cylindrical sleeve 132. As also shown therein, the first thermistor 160 extends radially outward from the rod 128 between magnets 122, 124 (and is sandwiched therebetween) and is arranged in close association or touching contact with the sleeve 132. While FIG. 2 shows a space between magnets 122 and 124, it is envisioned that the magnets 122 and 124 are in stacked relationship within one another and define only a nominal gap to allow the first thermistor 160 to reach the wall of the sleeve 132. In this respect, rather than sensing the temperature of the magnets, the thermistor 160 is positioned to sense the temperature of the sleeve 132. Other mounting configurations for the magnets and first thermistor are also possible.

With further reference to FIGS. 1 and 2, in either configuration, a second thermistor 170 is operatively placed in the reservoir within the filter housing 130 for measuring the temperature of the fluid within the reservoir. The second thermistor 170 is positioned so as to ensure that the reading of the second thermistor 170 is the precise temperature of the fluid. In certain embodiments, the second thermistor 170 may be placed elsewhere within the fluid flow loop of the hydronic heating system for measuring the temperature of the fluid passing there through (e.g., outside of the housing 130).

It shall be noted that, for the purpose of temperature measurement, thermistors 160 and 170 are utilized in the present embodiment. However, other types of temperature sensors can be deployed in other embodiments of the present invention, including but not limited to thermocouples, resistance temperature detectors (RTD's) and the like.

Both thermistors 160 and 170 are in informational communication with a central monitoring system 901 remotely located to the magnetic filter assembly 100 and are capable of sending temperature information to the central monitoring system 901 via either a wired network having transmission lines 162 and 172, or via a wireless network, as discussed in detail hereinafter.

With further reference to FIGS. 1 and 2, in an embodiment, a signal light and a control unit 112 with an array of buttons may be integrated onto the top side of the filter cap 110. The signal light and control unit 112 is configured to indicate to a user a status of the magnetic filter assembly 100 based on the temperature detected by the thermistors 160 and 170, as well as allow the user select to set a variety of parameters for determining the status of the magnetic filters filter assembly 100. In an embodiment, the magnetic filter assembly 100 may also include an audible alarm configured to alert a user as to the status of the magnetic filter assembly 100. Other types of alerts are also possible.

Figure 3:
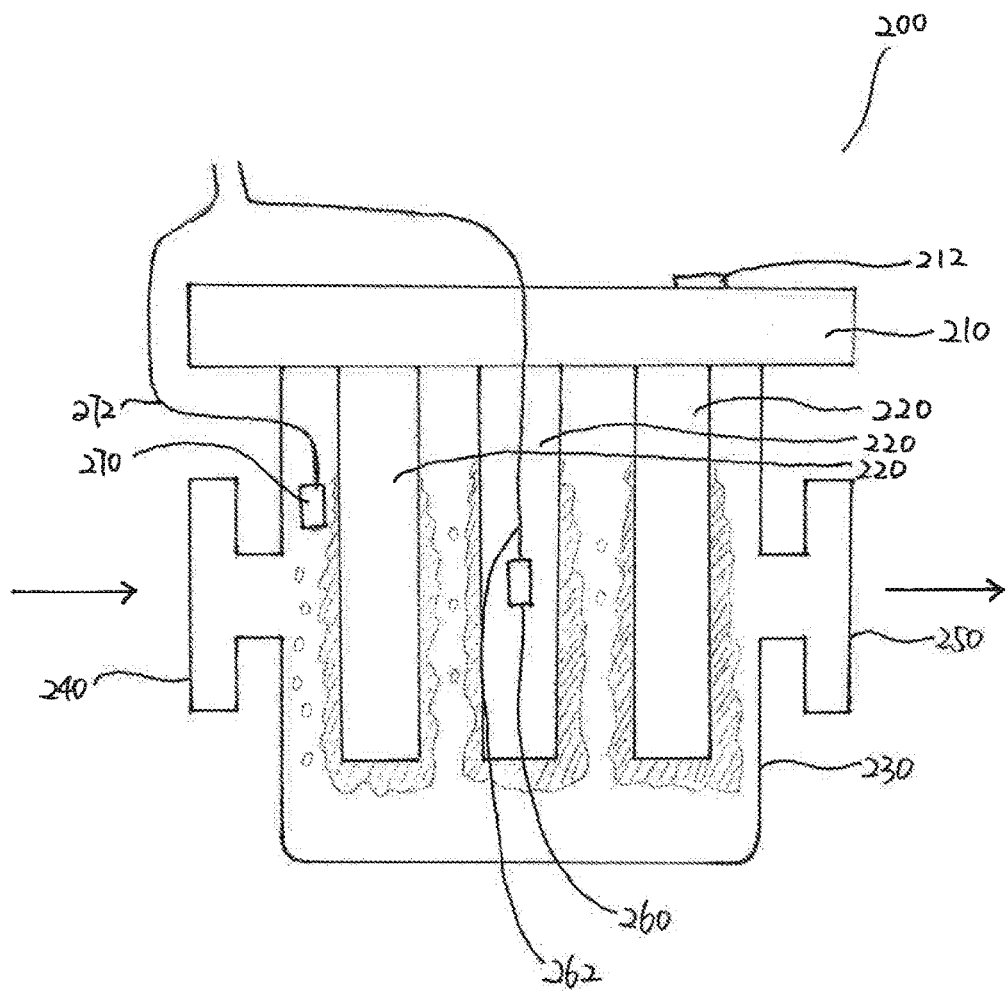
FIG. 3 is a cross-sectional view of a magnetic filter assembly, according to yet another embodiment of the present invention.

Referring to FIG. 3, in another embodiment, a magnetic filter assembly 200 includes a filter housing 230 operatively connected to a removable filter cap 210, which forms a fluid tight seal with filter housing 230 when in place, as well as inlet port and outlet port 240 and 250, respectively. A reservoir is thereby formed within the filter housing 230.

As shown in FIG. 3, more than one magnet 220 is disposed within the reservoir, with one end of the magnets affixed to the bottom side of the filter cap 210 and the bodies of the magnets 220 extending down into the sealed reservoir for facilitating the removal of magnetite sludge from the fluid passing therethrough. As with the magnets 120 described above in connection with FIG. 1, magnets 220 may be arranged in any configuration within the filter assembly 200.

As illustrated in FIG. 3, one thermistor 260 is embedded in one of the magnets 220 and is physically isolated from the fluid for measuring the lagging temperature of the fluid due to the insulating effect of the filtered magnetite surrounding the magnet 220, while one thermistor 270 is placed in the reservoir (or elsewhere in the fluid flow loop) for measuring the temperature of the fluid within the reservoir. The thermistors 260 and 270 are in informational communication with the central monitoring system 901 remotely located to the magnetic filter assembly 200 and are capable of sending temperature information to the central monitoring system 901 via either wired network having transmission lines 262 and 272, or via wireless network.

As shown in FIGS. 1-3, the fluid carrying magnetite sludge in the hydronic heating system enters into the reservoir from the inlet port 140, fills the reservoir, and then exits the reservoir through the outlet port 150. The magnet 120 produces a magnetic field within the reservoir and captures the magnetite sludge in the fluid before the fluid exits the reservoir through the outlet port 150, as is generally known in the art. Thereby, the fluid is filtered and the magnetite sludge is separated from the fluid and retained in the magnetic filter assembly 100.

During operation of the hydronic heating system, a temperature within the magnet 120 (or at the wall of the sleeve 132) and a temperature of the fluid are detected by the first and second thermistors 160, 170, respectively. For example, a first temperature reading of the magnet 120 or sleeve 132 is detected by the thermistor 160 and a second temperature reading of the fluid is detected by the thermistor 170. The difference between the first temperature reading and the second temperature reading, $\Delta t$, is then determined by a control unit, such as the control unit 112, 212 present on the filter assembly, one integrated with the central monitoring system 901, or a boiler electronic controller.

When the magnet 120 is clean and there has not been any magnetite sludge building-up on the magnet 120 or sleeve 132, the Δt is small, if not zero. However, over the time, as the magnetite sludge captured by the magnet 120 gradually builds up on the outside surface of the magnet 120 or sleeve 132, the thermistor 160 is further insulated from the fluid passing through the filter assembly 100. Therefore, compared to the fluid temperature recorded by the thermistor 170, the thermistor 160 records a lagged temperature of the magnet 120 due to the building-up of the magnetite sludge. Importantly, the Δt increases when the buildup of magnetite sludge increases, due to the insulative properties of the magnetite sludge.

Importantly, once the temperature readings are received by the control unit (again, either by the control unit 112 integrated with the filter assembly 100, the control unit of the central monitoring system 901), or the boiler electronic controller, the difference between the two temperature readings, Δt, is determined. This determined Δt value is compared to a predetermined or preset threshold Δt value stored in memory. If the determined Δt value exceeds the threshold value, a status notification can be sent to the user of the hydronic heating system by the central monitoring system 901, indicating that the magnetic filter assembly 100 has reached its maximum effective filtration saturation point and that the maintenance work of cleaning the magnetic filter assembly 100 must be carried out. This status of the magnetic filter assembly 100 can also be sent to the control unit 112 and used to notify the user by the signal light in the control unit 112.

Figure 4:
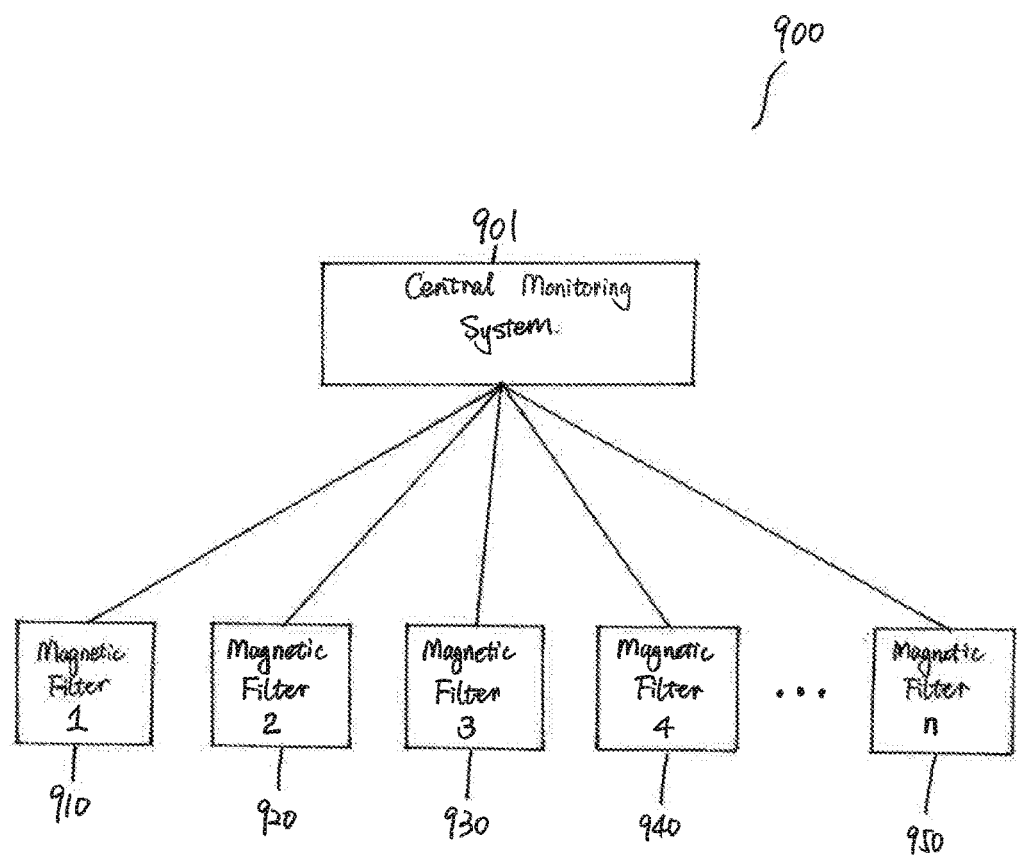
FIG. 4 is a diagram of a functional structure of a status monitoring system for the magnetic filters, according to yet another embodiment of the present invention.

Referring to FIG. 4, a status monitoring system for the magnetic filters 900 includes the central monitoring system 901, and one or more magnetic filter assemblies 910, 920, 930, 940, 950. Each of the magnetic filter assemblies 910, 920, 930, 940, 950 is constructed as discussed above, and is in communication with the central monitoring system 901 via either the wired network or wireless network. The temperature reading of the thermistors 160 and 170 in each of the magnetic filter assemblies are sent to the central monitoring system 901 either continuously or periodically for determining the Δt of each magnetic filter assembly. When the Δt of one magnetic filter assembly reaches the pre-determined temperature value, a notification would be sent to the user of the system informing the user on which magnetic filter assembly the maintenance work should be performed.

In the preferred embodiment, the threshold temperature value that will trigger a maintenance/cleaning alter or notification can be set, reviewed, or revised on the central monitoring system 901, as well as on the control unit 112 of each magnetic filter assembly 100. For example, the control unit 112 may include an interface enabling a user to adjust the threshold temperature that will trigger the alert/notification. In an embodiment, the threshold Δt values that triggers a cleaning/service alert may be between approximately 10° F. and 20° F. and, more preferably 15° F.

The status monitoring system of the present invention therefore provides for the remote monitoring of a magnetic filter in order to determine, without manual inspection, when the filter is nearing or has reached its saturation point and requires cleaning or servicing. As a result, labor costs and time spent cleaning or servicing such filters when no cleaning is actually necessary may be substantially decreased. In addition, by providing an automatic notification to a user when magnetic filter effectiveness has reached or is nearing an apex, timely cleaning is encouraged which, if carried out, decreases the likelihood of system failure due to the buildup of magnetite, and increases system efficiency, as a whole.

In an embodiment, there may typically be a single magnetic filter installed at a facility, but it is possible that there could be multiple filters if the facility is large. As discussed above, a single or multiple filters could be connected into the boiler's electronic control system so that the temperatures detected by the thermistors indicating a lag due to sludge buildup can be sent to the control system for analysis and processing, and so that an alert or message may be generated regarding the operational status of the filter.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A status monitoring system for a magnetic filter, comprising:
    a filter housing having an inlet and an outlet and configured for connection to a fluid flow loop;
    at least one magnet within said filter housing;
    a first temperature sensor configured to measure a temperature of said at least one magnet; and
    a second temperature sensor configured to measure a temperature of a fluid within said fluid flow loop.

2. The status monitoring system of claim 1, further comprising:
    a control unit configured to determine a difference in temperature between said temperature of said fluid and said temperature of said at least one magnet, and to generate a notification if said difference in temperature exceeds a threshold temperature difference.

3. The status monitoring system of claim 2, wherein:
    said first temperature sensor is embedded within said at least one magnet; and
    said second temperature sensor is positioned within said filter housing.

4. The system monitoring system of claim 2, wherein:
    said first temperature sensor is embedded within said at least one magnet; and
    said second temperature sensor is positioned within said fluid flow loop outside of said housing.

5. The system of claim 3, further comprising:
    a cap removably connected to said filter housing;
    wherein said at least one magnet is attached to said cap and extends into said filter housing.

6. The system of claim 1, wherein:
    said first temperature sensor and said second temperature sensor are thermistors.

7. The system of claim 1, wherein:
    said at least one magnet is a plurality of magnets each having an associated temperature sensor.

8. The system of claim 2, wherein:
    said notification includes at least one of an audible alert and a visual indication.

9. The system of claim 5, wherein:
    said cap includes an interface for manually setting said threshold temperature difference.

10. The system of claim 1, wherein:
said fluid flow loop forms a part of a hydronic heating system.

11. A magnetic filter, comprising:
a housing having an inlet and an outlet and defining a reservoir for receiving a fluid;
a structure received within said housing for receiving at least one magnet inside a cavity of said structure; wherein said cavity is isolated from said fluid;
a first temperature sensor disposed inside said cavity and is configured to detect a temperature of said structure.

12. The magnetic filter of claim 11, further comprising:
a second temperature sensor positioned within said housing and being configured to measure a temperature of a fluid within said housing.

13. The magnetic filter of claim 12, wherein:
the first temperature sensor and the second temperature sensor are communicatively coupled to a control unit;
wherein the control unit is configured to determine a difference in temperature between said temperature of said fluid and said temperature of said structure, and to generate a notification if said difference in temperature exceeds a threshold temperature difference.

14. The magnetic filter of claim 13, further comprising:
a cap removably connected to said housing;
wherein said magnet is attached to said cap and extends into said housing.

15. The magnetic filter of claim 13, wherein:
said notification includes at least one of an audible alert and a visual indication.

16. The magnetic filter of claim 14, wherein:
said cap includes an interface for manually setting said threshold temperature difference.

17. The magnetic filter of claim 11, wherein:
wherein said first temperature sensor is disposed in close association with the inner wall of said cavity so as to detect the temperature of the inner wall of said cavity.

18. A method for monitoring the status of a magnetic filter, comprising the steps of:
sensing a temperature of a fluid circulating through a housing;
sensing a temperature of a magnet within the housing;
determining a temperature difference between said temperature of said fluid and said temperature of said magnet; and
comparing said determined temperature difference with a threshold temperature difference; and
generating a notification if said determined temperature difference exceeds said threshold temperature difference.

19. The method according to claim 18, wherein:
said notification includes at least one of an audible alert and a visual alert.

20. The method according to claim 18, further comprising the step of:
adjusting said threshold temperature difference via an interface associated with said housing or a cap connected to said housing.

* * * * *